(12) United States Patent
Gravina et al.

(10) Patent No.: US 10,711,880 B2
(45) Date of Patent: Jul. 14, 2020

(54) PLANET-CARRIER FOR AN EPICYCLIC GEARING AND EPICYCLIC GEARING PROVIDED WITH SUCH A PLANET CARRIER

(71) Applicant: GE Avio S.r.l., Rivalta di Torino (IT)

(72) Inventors: Michele Gravina, Minervino Murge (IT); Giuseppe Casamirra, Turin (IT)

(73) Assignee: GE Avio S.r.l., Rivalta di Torino (IT)

( * ) Notice: Subject to any disclaimer, the term of this patent is extended or adjusted under 35 U.S.C. 154(b) by 286 days.

(21) Appl. No.: 15/921,490

(22) Filed: Mar. 14, 2018

(65) Prior Publication Data
US 2018/0266541 A1    Sep. 20, 2018

(30) Foreign Application Priority Data
Mar. 17, 2017    (IT) .......................... 102017000029839

(51) Int. Cl.
*F16H 1/28*    (2006.01)
*F16H 57/08*   (2006.01)
*F02C 3/107*   (2006.01)

(52) U.S. Cl.
CPC ........... *F16H 57/082* (2013.01); *F02C 3/107* (2013.01); *F16H 1/28* (2013.01); *F16H 1/2809* (2013.01);
(Continued)

(58) Field of Classification Search
CPC ........ F16H 57/082; F16H 1/2809; F16H 1/28; F02C 3/107
See application file for complete search history.

(56) References Cited

U.S. PATENT DOCUMENTS

| | | | | |
|---|---|---|---|---|
| 3,459,072 A | * | 8/1969 | Shannon | ............... F16H 1/2818 |
| | | | | 475/344 |
| 5,466,198 A | * | 11/1995 | McKibbin | ............... F02C 6/206 |
| | | | | 475/346 |
| 7,255,537 B2 | * | 8/2007 | Flamang | ................. F16C 35/06 |
| | | | | 416/170 R |

(Continued)

FOREIGN PATENT DOCUMENTS

| DE | 2 235 448 A1 | 2/1974 |
|---|---|---|
| DK | 2072858 T3 | 6/2010 |

(Continued)

OTHER PUBLICATIONS

Italian Search Report and Written Opinion issued in connection with corresponding IT Application No. 102017000029839 dated Jan. 9, 2018.

*Primary Examiner* — Patrick H Mackey
(74) *Attorney, Agent, or Firm* — Dority & Manning, P.A.

(57) ABSTRACT

A planet-carrier for an epicyclic gearing is provided with a ring having a plurality of plate sectors and a plurality of connection sectors, alternating with one another about a first axis; a connection structure connects in an angularly fixed manner the connection sectors to a rotating member or to a static member; the planet-carrier is also provided with a plurality of pins, which are fixed with respect to the plate sectors and protrude in opposite directions from the plate sectors along respective second axes, parallel and eccentric with respect to the first axis; each pin has two coaxial outer surfaces, adapted to support respective planet gears of the gearing and symmetrical to each other with respect to a symmetry plane orthogonal to the first axis; the plate sectors are asymmetrical with respect to this symmetry plane.

10 Claims, 3 Drawing Sheets

(52) U.S. Cl.
CPC ....... *B60Y 2200/50* (2013.01); *B60Y 2400/73* (2013.01); *F05D 2250/73* (2013.01); *F05D 2260/40311* (2013.01); *F16H 2001/289* (2013.01); *F16H 2057/085* (2013.01)

(56) References Cited

U.S. PATENT DOCUMENTS

| | | | | |
|---|---|---|---|---|
| 8,016,716 | B2* | 9/2011 | de Ugarte | F16H 57/082 475/331 |
| 8,425,374 | B2* | 4/2013 | Smook | F16H 57/082 475/348 |
| 8,734,288 | B2* | 5/2014 | Poon | F03D 15/00 475/331 |
| 8,747,278 | B2* | 6/2014 | Smook | F16H 57/082 475/348 |
| 9,028,361 | B2* | 5/2015 | Ordonez Vicente | F16H 57/082 475/331 |
| 9,145,967 | B2* | 9/2015 | Fox | F16H 57/082 |
| 9,297,364 | B2* | 3/2016 | Saenz De Ugarte Sevilla | F03D 15/00 |
| 2004/0038770 | A1* | 2/2004 | Flamang | F03D 1/00 475/348 |
| 2011/0190094 | A1* | 8/2011 | Polacco | F16H 57/082 475/331 |

FOREIGN PATENT DOCUMENTS

| | | |
|---|---|---|
| DK | 2072863 T3 | 7/2012 |
| EP | 2 339 208 A1 | 6/2011 |
| EP | 2 375 067 A1 | 10/2011 |
| EP | 2 998 615 A2 | 3/2016 |
| GB | 2 395 529 A | 5/2004 |
| WO | 02/14690 A1 | 2/2002 |
| WO | 02/079644 A1 | 10/2002 |
| WO | 2005/050058 A1 | 6/2005 |
| WO | 2005/050059 A1 | 6/2005 |
| WO | 2013/065024 A1 | 5/2013 |

* cited by examiner

PLANET-CARRIER FOR AN EPICYCLIC GEARING AND EPICYCLIC GEARING PROVIDED WITH SUCH A PLANET CARRIER

BACKGROUND OF THE INVENTION

Embodiments of the present invention relate to a planet-carrier for an epicyclic gearing, in particular for aeronautical applications, to which the following description shall refer, although without loss of generality.

The project leading to this patent application has received funding from the Clean Sky 2 Joint Undertaking under the European Union's Horizon 2020 research and innovation programme under grant agreement No CS2-ENG-GAM-2014-2017-05.

SUMMARY OF THE INVENTION

As is known, epicyclic gearings are widely used in the field of aeronautical engines to transmit motion and convert power between a turbomachine (having high speed and low torque) and at least one propulsive element (having high torque and low speed), as they are very efficient in performing this function with limited weight and overall dimensions.

Outside the aeronautical field, there are similar design solutions, above all in the wind turbine construction field, where the gearing however acts as speed multiplier, and not as reducer.

Besides the natural saving of weight, the need to reduce the dimensions of the gearing as much as possible is particularly felt in new aero engine architectures being studied to reduce consumption and pollution (such as "integral drive" and "open rotor" type "turbo fan" architectures). In fact, in these architectures the epicyclic gearing is integrated with a turbomachine, so that the overall dimensions of the diameter of the gearing tends to influence the geometries of the channels for the passage of air flow or exhaust gases, and therefore have a decisive influence on the output of the same turbomachine.

An advantageous solution of embodiment of these gearings provides for the use of a planet-carrier having an annular plate supporting two arrays of planet gears, arranged on opposite sides of the same plate. In particular, the planet gears are mounted by means of bearings on respective pins, which protrude from the plate in opposite directions along directions parallel to the axis of the gearing.

There is great need to achieve perfectly equal distribution of the loads along the various torque transfer paths in the gearing. This equal distribution is a necessary condition for achieving maximum lightness and minimum overall dimensions of the gearing. In fact, potential maldistribution of the load and the uncertainty in estimating this maldistribution makes it necessary to use overload factors when designing and sizing the components of the gearing (cogwheels, bearings, etc.), regardless of what their effective state of stress is, with consequent oversizing of all the parts, even those that are in practice less stressed.

The solution described in WO2013065024 effectively reduces maldistribution of the loads, introducing couplings with radial rotation axis to support the plate. However, this solution requires a relatively large number of components, and the couplings are at risk of wear in parts coupled with friction, and hence they are somewhat unreliable.

It is therefore preferable to attempt to design solutions in which the gearing has no joints. However, in this type of solution, the plate is generally subject to a bending moment at the joining points in which it is connected to a connection structure for motion input/output or to a fixed connection structure. Bending of the plate, as a result of these localized bending moments, causes an inclination of the axes of the pins that support the planet gears, leading to undesirable imbalance, or maldistribution of the loads, on the planet gears between the two arrays and giving rise to undesirable reaction stress in the connection zone between the pins and the plate.

The solution described in EP2998615 solves these problems by coupling the plate by means of pairs of deformable arms, to allow a relative movement under load between the plate and the connection structure. In particular, the flexibility of these arms prevents the transfer of localized bending moments from the connection structure to the plate, so that this latter can be produced with an extremely limited thickness, i.e. with high flexibility, which automatically offsets any relative displacements in tangential direction between two coaxial planet gears belonging to two different arrays of planet gears. Having a very low flexural rigidity also means that overloads are reduced in the zones in which the planet-carrier pins are connected to the plate.

Nonetheless, this solution is not completely satisfactory, as the aforesaid pairs of arms have considerable overall dimensions in circumferential direction and occupy space that could be used for the planet gears. In other words, with this type of solution it is not possible to provide more than three or, at most, four planet gears for each array.

The object of embodiments of the present invention is to produce a planet-carrier for an epicyclic gearing that allows the aforesaid problems to be solved simply and inexpensively.

According to embodiments of the present invention, there is produced a planet-carrier for an epicyclic gearing as defined in claim 1.

Embodiments of the present invention also relate to an epicyclic gearing as defined in claim 9.

BRIEF DESCRIPTION OF THE DRAWINGS

Embodiments of the invention will now be described with reference to the accompanying drawings, which illustrate a non-limiting example of embodiment thereof, wherein.

DETAILED DESCRIPTION

Figure 2:
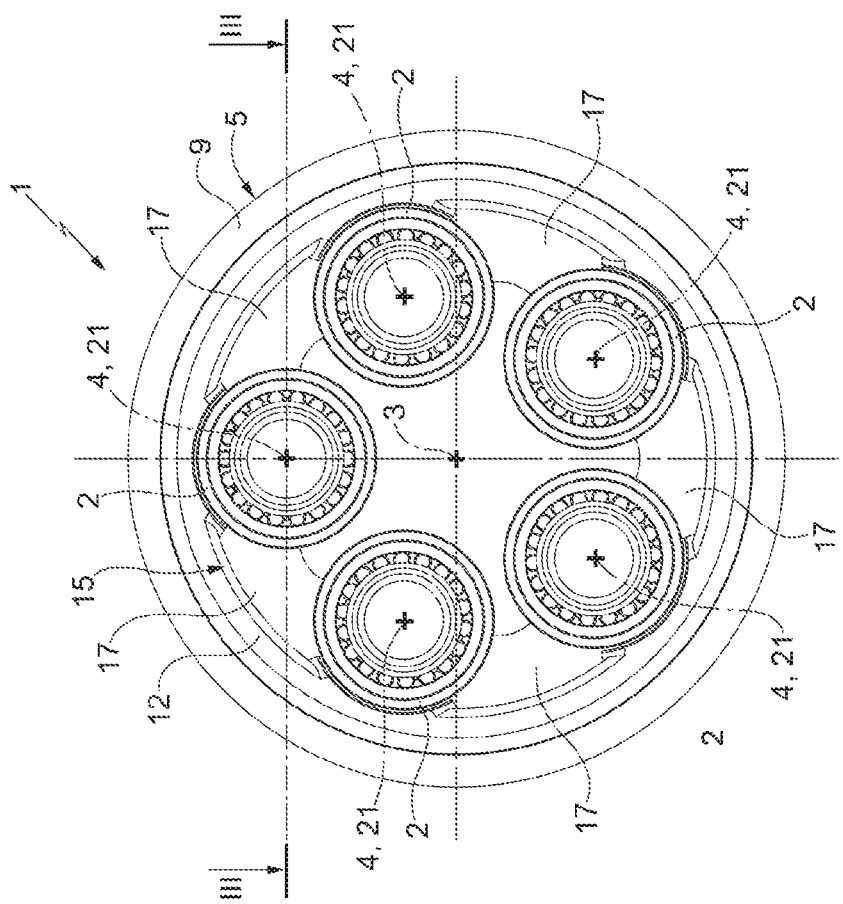
FIG. 2 is an axial view of the gearing of FIG. 1.
Figure 1:
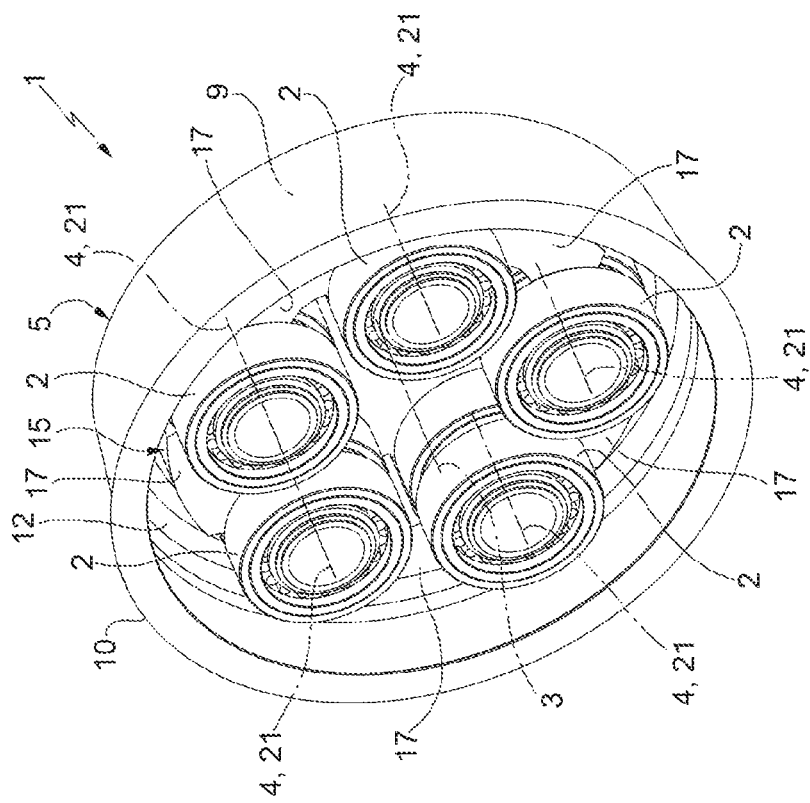
FIG. 1 shows, in a perspective and simplified view, an epicyclic gearing provided with a preferred embodiment of the planet-carrier according to embodiments of the present invention

With reference to FIGS. 1 and 2, the reference numeral 1 indicates, as a whole, an epicyclic gearing (shown in a simplified manner) comprising a plurality of planet gears 2, which are arranged about an axis 3, rotate about respective axes 4, parallel and eccentric with respect to the axis 3, and are supported by a planet-carrier or gear train carrier 5. The toothings of the planet gears 2 are not shown in the accompanying figures and, in an embodiment, are cylindrical with straight teeth.

The planet gears 2 are arranged to form two arrays, which are symmetrical with respect to a plane P orthogonal to the axis 3 (FIG. 3) and mesh, radially toward the inside, with at least one sun gear (not shown), which is coaxial and angularly fixed with respect to a motion transmission member.

Radially toward the outside, the planet gears 2 can mesh with at least one internal toothing of a ring gear (not shown).

In an embodiment, the axes 4 of the planet gears 2 are angularly equidistant with respect to one another about the axis 3.

In an embodiment, the planet-carrier 5 is defined by a monolithic body, i.e. a body made in a single piece, and comprises an annular structure 9, which defines a torque extraction/insertion member and terminates with a connection element 10, for example a flange, defining a coupling for connecting the planet-carrier 5 in an angularly fixed manner to a member, not shown, for example to a motion output or input shaft, or to a static structure.

At the opposite axial end with respect to the connection element 10, the structure 9 terminates with an annular portion 12 connected to a ring 15 of the planet-carrier 5. In particular, the portion 12 and the element 10 are arranged on opposite axial sides of the plane P.

The ring 15 is coaxial to the structure 9 along the axis 3 and comprises a plurality of sectors 16 (FIGS. 3 and 4) and a plurality of sectors 17, alternating with one another in circumferential direction about the axis 3.

Figure 3:
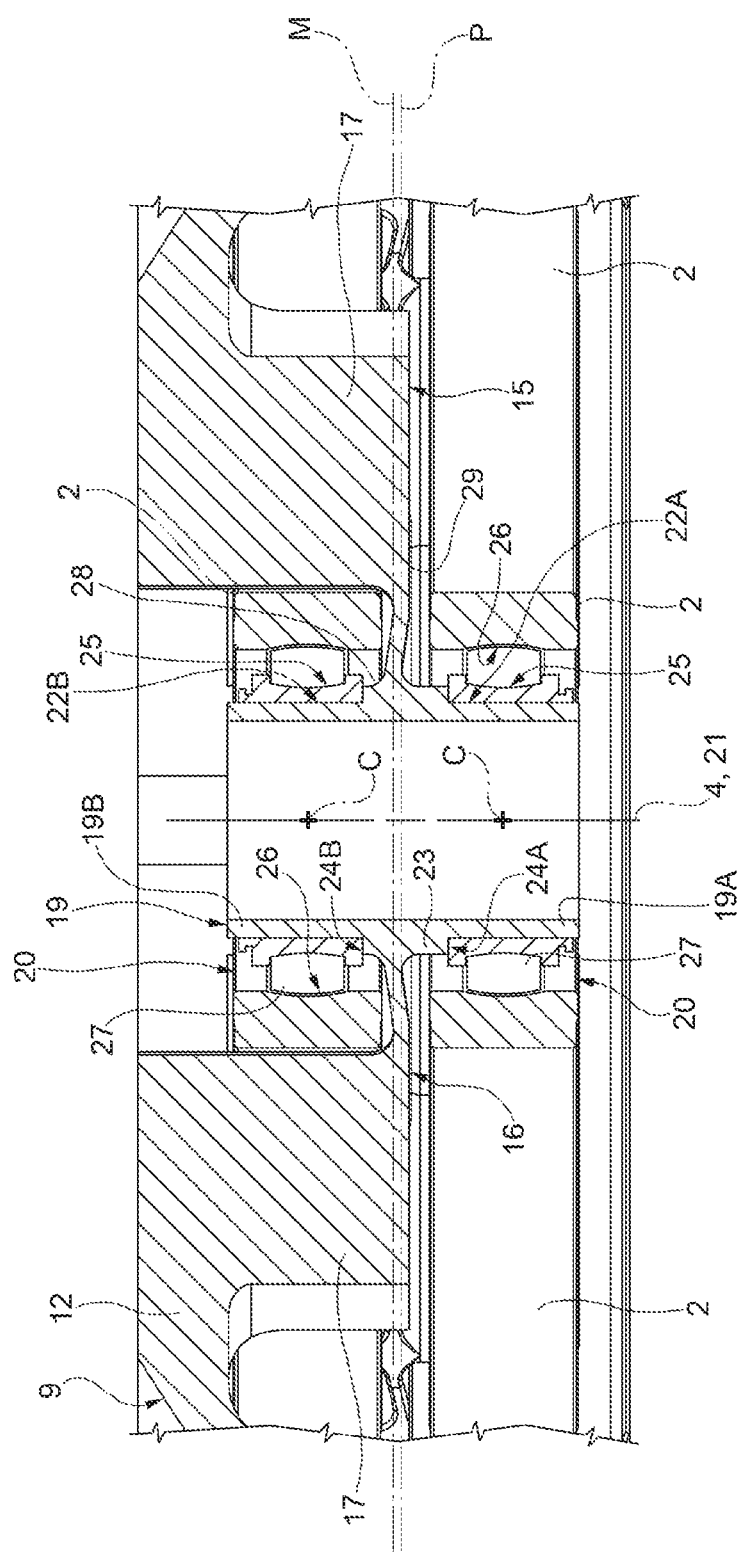
FIG. 3 is a section, in enlarged scale, according to a section plane indicated by the line III-III of FIG. 2.
Figure 4:
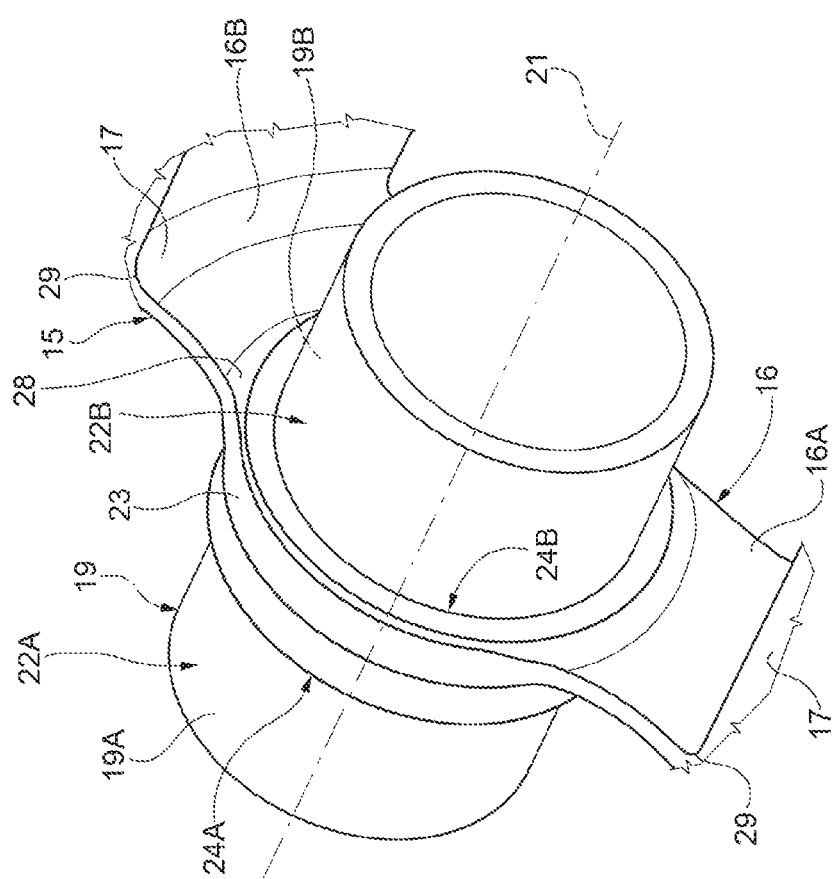
FIG. 4 is a perspective view, in enlarged scale and with parts removed for clarity, of a detail of the planet-carrier of FIG. 1.

As can be seen in FIGS. 3 and 4, the sectors 16 are defined by plate sectors, i.e. have a thickness, measured in the direction parallel to the axis 3, less than the dimension in radial direction and than the dimension in circumferential direction. For example, the sectors 16 have a thickness of less than 10 mm (typically a thickness of 5-7 mm).

The sectors 17 are more rigid to bending with respect to the sectors 16. The sectors 17 are coupled to the portion 12 of the structure 9 in an angularly fixed manner, so as to transfer the shearing actions (tangential forces) and therefore the torque between the ring 15 and the structure 9.

In particular, the sectors 17 are connected rigidly to the portion 12. In an embodiment, the sectors 17 and the structure form parts of a single piece. According to variants that are not shown, the structure 9 is a separate part from the ring 15 and is fastened thereto during assembly of the gearing 1.

As mentioned above and as visible in FIG. 3, the portion 12 is spaced axially from the plane P, so that the transfer of torque between the ring 15 and the structure 9 takes place at one of the two axial sides of the ring 15. Shape and size of the structure 9 are determined in the design phase also as a function of the diameter of the planet gears 2 and of the position of the axes 4 so as to leave sufficient radial clearance to fit and remove the planet gears 2.

With reference to FIG. 3, the planet gears 2 are supported by pins 19, by means of respective bearings 20. Each pin 19 is part of the planet-carrier 5 and extends along an axis 21 that coincides with the axis 4 in design conditions.

In an embodiment, each pin 19 is made in a single piece with a corresponding sector 16. According to a variant, not shown, the pins 19 are separate parts that are fixed to the respective sectors 16, for example through interference fit.

As can be seen in FIG. 4, each pin 19 comprises two portions 19A and 19B that protrude axially in opposite directions with respect to the corresponding sector 16. In particular, each sector 16 comprises two portions 16A and 16B arranged on opposite sides of the corresponding pin 19, in circumferential direction about the axis 3.

In an embodiment, the portions 19A and 19B have respective outer surfaces 22A and 22B, coaxial to each other and defining the seats on which the bearings 20 are fitted. In particular, the portions 19A and 19B are separated axially from each other by a projection 23 which is, in an embodiment, circular and continuous about the axis 21 and protrudes radially outward with respect to the surfaces 22A and 22B. In particular, each projection 23 has two opposite faces 24A and 24B defining axial shoulders against which the bearings 20 rest. In an embodiment, the pins 19 are hollow axially and are engaged internally by connection devices (not shown) that lock the bearings 2 axially against the faces 24A and 24B.

With reference to FIG. 3, the bearings 20 are, in an embodiment, defined by rolling bearings and comprise respective inner raceways 25, defined in particular by respective rings that are fitted onto the surfaces 22A and 22B and are resting axially against the faces 24A ad 24B.

The bearings 20 also comprise respective outer raceways 26, which are, in an embodiment, defined directly by inner surfaces of the planet gears 2.

According to variants, not shown, the raceways 26 are defined by rings separate from the planet gears 2; and/or the raceways 25 are defined by the surfaces 22A and 22B.

In an embodiment, the bearings 20 are self-aligning roller bearings, i.e. bearings that allow free rotation of the raceways 25 with respect to the raceways 26 about rotation centres C arranged on the axes 21, and therefore allow the rotation axis 4 of each planet gear 2 to be automatically aligned with respect to the axis 21 about the centre C in the operating conditions. For this purpose, the outer raceways 26 are toroidal or spherical with centre C. In an embodiment, each bearing 20 comprises a single row of barrel rollers 27.

The aforesaid plane P is defined by a plane with respect to which the surfaces 22A and 22B are mutually symmetrical. More in detail, the plane P is defined by a plane with respect to which the bearings 20 and the centres C are mutually symmetrical.

With reference to FIG. 4, each sector 16 comprises at least one connection zone 28 that is joined to the corresponding projection 23 and, in particular, defines at least one fillet to prevent the formation of sharp edges. Moreover, each sector 16 terminates, in circumferential direction, with two opposite connection zones, which are indicated by the reference numeral 29 and are joined to the two sectors 17 that are adjacent. In particular, the zones 29 define at least one fillet to prevent the formation of sharp edges.

According to a preferred aspect of the present description, as can be seen in FIG. 3, at least one of the sectors 16 is asymmetrical with respect to the plane P. i.e. has an asymmetrical shape and/or position with respect to the plane P.

In an embodiment, all the sectors 16 have the same shape and axial position, so that they differ from one another only in axial position about the axis 3.

In particular, for each pin 19, the zone 28 is arranged axially along a plane M that is orthogonal to the axis 21 and is spaced axially apart from the plane P. More in detail, the plane M is spaced apart from the plane P toward the axial side in which the portion 12 of the structure 9 is arranged, where the sectors 17 are coupled.

In an embodiment, the zones 29 are arranged symmetrically along the plane P so as not to interfere axially with the toothings of the bearings 2 and limit the axial overall dimensions of the gearing 1. Therefore, given the asymmetry of the zones 28, the sectors 16 have a shape that is not flat and/or is not perfectly orthogonal to the axis 3.

The asymmetrical configuration of the sectors 16, with respect to the plane P, allows the loads to be equally distributed among the various torque paths, i.e. among the various planet gears 2, in operating conditions. In particular, the asymmetry of the sectors 16 offsets the fact that the torque is transferred between the portion 12 of the structure 9 and the ring 15 in asymmetrical axial position with respect to the plane P.

It can be noted, for example by means of computer simulations, that the asymmetrical configuration of the sectors 16 reduces rotations of the axes 21 of the pins 19 under load during operation, with respect to a symmetrical configuration. In other words, due to this offsetting, the pins 19 tend to be isolated from the structure 9 with regard to deflections, so that the deformations under load of the structure 9 do not vary the alignment of the axes 21, which hence remain parallel to one another. This results in uniform distribution of loads on the toothings of the planet gears 2 between one and the other of the two arrays.

The extent of the asymmetry, and in particular the extent of the axial offset between the plane P and the plane M, is determined in the design phase, in particular based on computer simulations, in order to optimally distribute the loads uniformly between the bearings of the two arrays.

At the same time, the asymmetry of the sectors 16 does not affect the overall dimensions of the gearing 1 in circumferential direction, so that it is possible to provide, in each array of planet gears, even more than four planet gears 2, as in the shown example.

Moreover, the fact that the planet-carrier 5 is made in a single piece not only reduces the number of parts to be manufactured and assembled, and therefore the complexity, but also reduces the risks of breakages caused by fretting fatigue on components in contact, subject to cyclic loads.

From the above it is evident how changes or variants may be made to the planet-carrier 5 and the gearing without departing from the scope of protection as defined in the appended claims.

In particular, the extent of the asymmetry and the shape of the sectors 16 could differ from that indicated by way of example.

Moreover, the gearing 1 could be configured with static planet-carrier and rotating ring gear ("star" configuration), with rotating planet-carrier and static ring gear ("planetary" configuration), or with all the elements rotating ("differential" configuration).

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A planet-carrier for an epicyclic gearing, the planet-carrier comprising:
   a ring having a first axis and comprising a plurality of plate sectors and a plurality of connection sectors, alternating with one another about the first axis;
   a connection structure coupled in an angularly fixed manner to the connection sectors and adapted to be connected, in use, in an angularly fixed manner to a rotating member or to a static structure;
   a plurality of pins, which are fixed with respect to the plate sectors and protrude in opposite directions from the plate sectors along respective second axes, parallel and eccentric with respect to the first axis; each pin having two outer surfaces coaxial along the respective second axis, adapted to support respective planet gears of the gearing and symmetrical to each other with respect to a symmetry plane orthogonal to the first axis;
   wherein at least one of the plate sectors is asymmetrical with respect to the symmetry plane.

2. The planet-carrier according to claim 1, wherein all the plate sectors are asymmetrical with respect to the symmetry plane.

3. The planet-carrier according to claim 1, wherein the plate sectors comprise first connection zones joined to the pins; the first connection zone of the at least one of the plate sectors being arranged axially along a plane that is orthogonal to the second axis and is spaced axially apart from the symmetry plane.

4. The planet-carrier according to claim 3, wherein the plane is spaced axially apart from the symmetry plane toward an axial side in which the connection sectors are coupled to the connection structure.

5. The planet-carrier according to claim 3, wherein the pins comprise respective outer projections that axially separate the outer surfaces from each other; the first connection zones being joined to the outer projections.

6. The planet-carrier according to claim 3, wherein the plate sectors comprise second connection zones joined to the connection sectors and arranged along the symmetry plane.

7. The planet-carrier according to claim 1, wherein the at least one of the plate sectors has a shape that is not flat and/or is not orthogonal to the first axis.

8. The planet-carrier according to claim 1, wherein the ring, the connection structure and the pins form parts of a body in a single piece.

9. The epicyclic gearing comprising:
   a planet-carrier according to claim 1;
   two arrays of planet gears, which are supported by the outer surfaces by means of respective bearings, symmetrical with respect to the symmetry plane;
   at least one sun gear that can rotate about the transmission axis and meshes with the planet gears.

10. The epicyclic gearing according to claim 9, wherein the bearings are self-aligning rolling bearings, comprising respective inner raceways and respective outer raceways which can rotate with respect to the inner raceways about respective rotation centres, which are arranged on the second axes and are symmetrical to each other with respect to symmetry plane.

* * * * *